No. 765,821. PATENTED JULY 26, 1904.
L. DORNTON.
CORN HUSKER AND SHREDDER.
APPLICATION FILED MAY 4, 1903.
NO MODEL.
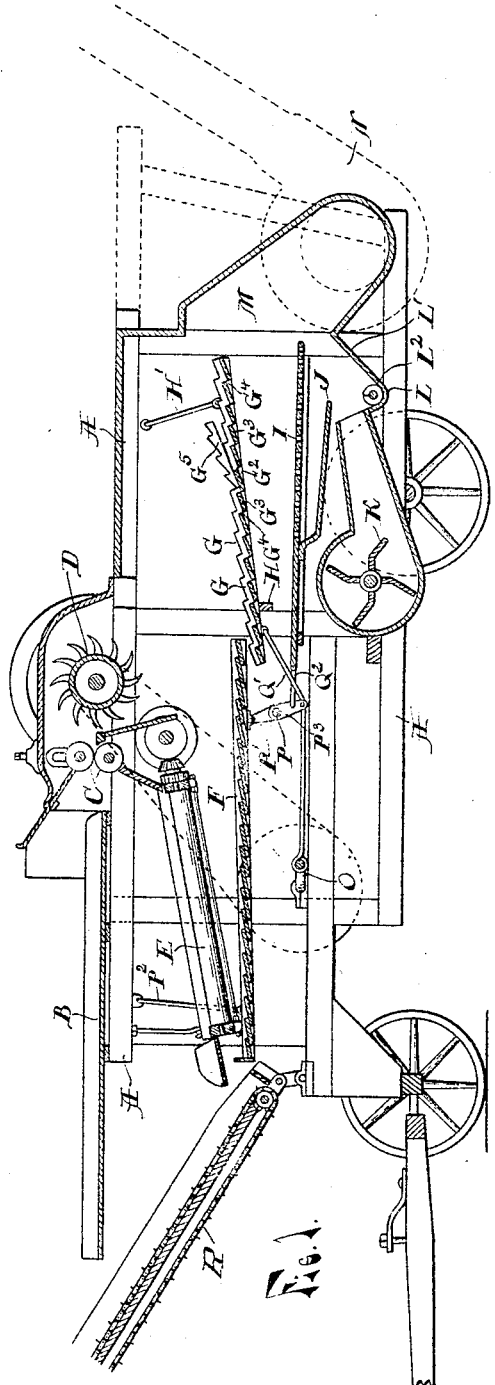
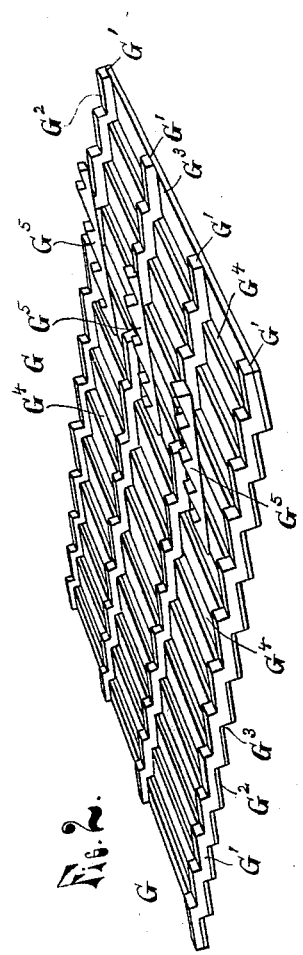
WITNESSES.
INVENTOR.
Louis Dornton
By Edmund J. Scully
Attorney.

No. 765,821. Patented July 26, 1904.

UNITED STATES PATENT OFFICE.

LOUIS DORNTON, OF SOUTH WOODSLEE, CANADA.

CORN HUSKER AND SHREDDER.

SPECIFICATION forming part of Letters Patent No. 765,821, dated July 26, 1904.

Application filed May 4, 1903. Serial No. 155,500. (No model.)

*To all whom it may concern:*

Be it known that I, LOUIS DORNTON, a citizen of Canada, residing at South Woodslee, in the county of Essex and Province of Ontario, Canada, have invented certain new and useful Improvements in Corn Huskers and Shredders, of which the following is a specification.

This invention relates to improvements in corn huskers and shredders; and its object is to provide a machine which will not only effectually remove the husks from the ears and shred the stalks and leaves, but will separate all loose kernels and broken ears of corn from the fodder and husks and clean the corn thus separated out of all dirt.

To this end the invention consists in providing a vibratory closed deck or bottom beneath the husking-rolls and shredder. At the end of this deck, with one end projecting beneath the same, is provided a second open vibratory deck so constructed as to allow the smaller and heavier particles to drop through and at the same time will lift and loosen up the fodder to shake out all the corn, both decks being so constructed that their longitudinal vibratory movement feeds the fodder, &c., rapidly toward the rear of the machine.

The invention also consists in providing a chaffer or riddle beneath the open deck and below this chaffer in providing a blower-fan to clean the grain.

The invention consists, further, in the construction of the decks, the means for vibrating the same, and the particular arrangement and combination of parts, all as more fully described, and shown in the accompanying drawings, in which—

Figure 1 is a longitudinal vertical section of a device embodying my invention; and Fig. 2 is an enlarged detail of the open deck, showing the same in perspective.

As shown in the drawings, A is the frame; B, the feed-table; C, the feed or snapping rolls adjacent to the rear end of the table; D, the toothed cylinder-shredder extending across the machine adjacent to the rear side of the snapping-rolls, and E is a series of husking-rolls extending beneath the feed-table in an inclined position to receive the ears as they fall from the snapping-rolls, all arranged and operating as in the ordinary construction of machines of this class.

Extending beneath the husking-rolls and shredder is a vibratory bottom or deck F to catch the husks and fodder and any corn which may pass the snapping or husking rolls. This deck is inclined upward slightly toward the rear of the machine and is made of boards extending transversely of the machine, each with its rear edge overlapping the forward edge of the adjacent board in the manner of lap-siding, so that the upper surface of the deck will present a series of inclines extending in the direction in which the fodder is fed and a series of notches or shoulders to engage and feed the material forward as the deck is vibrated.

At the rear end of the deck F is a second deck or open rack G, which is also inclined upward toward the rear of the machine and at its forward end extends beneath the deck F a short distance to receive the fodder and grain therefrom. This rack consists of a series of parallel longitudinal bars $G'$, formed with inclines $G^2$ on both their upper and under edges, said inclines being inclined upward toward the rear and forming a series of notches or teeth on their upper sides to engage and feed the fodder forward. To these inclines on the lower sides of the bars are secured slats $G^3$, extending transversely of the rack and of such a thickness that spaces $G^4$ are left between the lower rear angle of each slat and the upper forward angle of the adjacent slat. Secured to the slats $G^3$ midway between the longitudinal bars $G'$ and extending upward with a rearward inclination thereto are the finger-bars $G^5$, also formed with notches or teeth, and the rack is supported near its forward end by a suitable supporting-bar H and near its rear end by hangers $H'$. The fodder is both lifted and fed along by the notches in the bars $G'$ and by the inclined slats, and the finger-bars $G^5$ further lift and shake up the fodder to separate out all the grain, which will fall on the slats and pass through the openings $G^4$ to a shaking-riddle or chaffer I, suitably supported below the rack G.

The grain is screened by this riddle I and falls through the same to a pan J, secured at one end to the riddle, which pan extends rearwardly to discharge the grain through a blast of air from a suitable fan K, a tail-board L' being provided to prevent it from being blown over, and at the bottom of this board is a concave L to receive the grain, provided with a conveyer-screw L² to convey the grain to a bagger or to any other place desired. The lighter particles blown out by the fan are carried over the tail-board into a passage M, leading to a suitable blower or pneumatic stacker N, and all of the fodder, &c., passing over the rear ends of the rack G and riddle I also falls into the passage and is conveyed away by the stacker.

Journaled in suitable bearings on the frame is a crank-shaft O, driven in any suitable manner, and beneath the rear end of the deck F is a transverse rock-shaft P, provided with rocker-arms P', engaging bearings on said deck to support and actuate the same, said deck being supported at its forward end by hangers P². A rocker-arm P³ extends downward from the rock-shaft, and a connecting-rod Q connects the crank O with the lower end of said arm, a connecting-rod Q' being also connected to its lower end at one end and to the rack G at its opposite end to actuate said rack. The riddle I and pan J are vibrated by a connecting-rod Q², which connects the end of said riddle and the arm P³ intermediate its ends, or a separate arm may be provided. The deck F and rack G are thus vibrated in opposite directions, and the effect of the inertia of one to vibrate the machine is overcome by that of the other, making a very steady-running machine.

A conveyer R is provided at the front end of the machine to receive the ears from the husking-rolls, and said rolls are so arranged and the carrier supported at such a distance above the tongue that a team may be hitched on without detaching the carrier.

What I claim as my invention, and desire to secure by Letters Patent, is—

1. In a corn husking and shredding machine, the combination, with snapping-rolls, a shredder adjacent to said rolls and a series of husking-rolls beneath the snapping-rolls, of a vibratory deck beneath the husking-rolls and shredder upon which the fodder and grain falls and is agitated by the motion thereof, a vibratory rack extending rearwardly from the deck with its forward end a short distance beneath the rear end of the deck, said rack being provided with upwardly-extending notched finger-bars and adapted to separate the finer and heavier particles from the coarser and lighter, and mechanism connected with a single shaft for vibrating said deck and rack in opposite directions.

2. In a corn husker and shredder the combination with snapping-rolls, a shredder adjacent to said rolls and a series of husking-rolls beneath the snapping-rolls, of a vibratory deck beneath the husking-rolls, and shredder, a vibratory rack extending rearwardly from the deck with its forward end underlying the rear end of the deck, a shaking riddle beneath said rack, and a single shaft and connections from said shaft to the deck, rack and riddle whereby all are operated from said single shaft.

3. In a corn husker and shredder, the combination with snapping-rolls, a shredder adjacent said rolls and a series of husking-rolls beneath the snapping-rolls, of a vibratory deck beneath the husking-rolls and shredder, a vibratory rack extending rearwardly from the deck with its forward end underlying the rear end of the deck, a shaking riddle beneath the rack, a single shaft and connections from said shaft to the deck, rack and riddle whereby all are actuated from said single shaft, and a pan mounted beneath and movable with said riddle.

4. In a corn husker and shredder, the combination with the snapping-rolls, a shredder adjacent said rolls, and a series of husking-rolls beneath the snapping-rolls, of a vibratory deck beneath the husking-rolls, and shredder, a vibratory rack extending rearwardly from the deck with its forward end underlying the rear end of the deck, a shaking riddle beneath the rack, a single shaft and connections from said shaft to the rack, deck and riddle whereby all are operated from said single shaft, said rack being provided with rearwardly-inclined finger-bars having notches upon their upper faces, as and for the purpose specified.

5. In a corn husking and shredding machine the combination — with snapping-rolls, a shredder and husking-rolls—of an upwardly and rearwardly inclined vibratory deck extending beneath the rolls and shredder and formed with a series of rearwardly and upwardly extending inclines forming feeding-notches in its upper surface, an upwardly and rearwardly inclined vibrating rack having transverse inclined slats with spaces between and having its rear end extended beneath the deck to receive the material therefrom, a rock-shaft extending beneath the deck, an upwardly-extending arm on said shaft pivotally secured to the deck to support and actuate the same, a hanger to support the opposite end of said deck, a downwardly-extending arm on the rock-shaft, a connecting-rod connecting said downwardly-extending arm and the rack to actuate the same, a vibratory riddle beneath the rack, a connecting-rod connecting the riddle and arm on the rock-shaft, a pan secured to the under side of and carried by the riddle, and a fan-blower to direct a blast of air past the end of the said pan to clean the grain as it falls therefrom.

6. In a corn husking and shredding machine the combination—with a feed-table, snapping-rolls located near the end of said table, a shredder adjacent to the rear of said snapping-rolls and a series of husking-rolls beneath the snapping-rolls—of an upwardly and rearwardly inclined vibratory deck beneath the husking-rolls and shredder and having inclines formed in its surface to form feeding-notches, an upwardly and rearwardly extending rack having transverse slats inclined upward at their rear edges with spaces between said slats, upwardly and rearwardly extending finger-bars on said rack provided with notches in their upper sides; a rock-shaft beneath the deck, arms on said rock-shaft pivotally attached at their upper ends to the deck, a downwardly-extending arm on said rock-shaft, a connecting-rod connecting said arm and the rack to actuate the same, a crank-shaft, a connecting-rod connecting said crank-shaft and the arm on the rock-shaft, means for turning the crank-shaft, a riddle beneath the rack, a connecting-rod connecting the riddle and an arm on the rock-shaft, a pan beneath the riddle and secured thereto to move therewith, a blower-fan to direct a blast of air past the end of said pan to clean the grain as it falls therefrom, a tail-board adjacent to the end of said pan, a concave at the lower side of said tail-board, a conveyer-screw within the concave to convey the cleaned grain and a pneumatic stacker to receive the fodder and convey the same away from the machine.

In testimony whereof I have signed my name to this specification in presence of two witnesses.

LOUIS DORNTON.

Witnesses:
OTTO F. BARTHEL,
LEWIS E. FLANDERS.